Feb. 16, 1937. I. L. BRICK 2,071,279
APPARATUS FOR TESTING IGNITION COILS AND CONDENSERS
Filed Dec. 3, 1935 4 Sheets-Sheet 1

Inventor
Irving L. Brick
By Chas. Silver.
Attorney

Feb. 16, 1937.  I. L. BRICK  2,071,279
APPARATUS FOR TESTING IGNITION COILS AND CONDENSERS
Filed Dec. 3, 1935  4 Sheets-Sheet 2

Inventor
Irving L. Brick
By Chas. Silver.
Attorney

Patented Feb. 16, 1937

2,071,279

UNITED STATES PATENT OFFICE 2,071,279

APPARATUS FOR TESTING IGNITION COILS AND CONDENSERS

Irving L. Brick, New York, N. Y., assignor to P. Sorensen Manufacturing Company, Incorporated, a corporation of New York Application December 3, 1935, Serial No. 52,724

2 Claims. (Cl. 175—183)

This invention relates to apparatus for testing ignition coils and condensers and has special reference to testing devices for automotive ignition coils and automotive condensers.

In prior testing devices for ignition coils, the determinations are based on the voltage output of the secondary. By gradually increasing the air gap between a pair of points (electrodes) and noting the length of gap at which the current ceases to jump the gap, the relative voltage output of the secondary will be shown by these tests, since the length of the gap that the current from the secondary will negotiate varies with the voltage output of the secondary. This, however, is not a fair or true reproduction of car-operating conditions. Furthermore, such a test while showing whether a coil is good or bad does not indicate satisfactorily how good or how bad the coil may be.

Ignition coils in automobiles are for the purpose of converting low tension (6 volts) storage battery current to high tension (1,500 to 4,000 volts) so as to provide a current of sufficient high tension to jump a fixed gap in the spark plugs and thereby ignite the combustible mixture of fuel and air which is drawn into the cylinder and then subjected to considerable pressure (from 40 to 100 lbs. per sq. inch) before ignition. The spark gaps are normally set at approximately .020 inch, which under a pressure of 80 lbs. per sq. inch and at the relatively high temperature of the combustion chamber corresponds to .250 inch under atmospheric conditions of temperature and pressure regarding its resistance to the flow of electricity.

Manufacturers of testing equipment for ignition coils have striven to reproduce car-operating conditions, but they appear to have ignored the fact that increasing the spark gap is a departure from and does not reproduce car-operating conditions. During car operation, increase of its speed does not increase the resistance of the gap, which in an automobile under operating conditions is the distance between the points in the spark plugs. Variations in speed have no effect whatever on the distance between electrodes or the spark points.

When the motor speed is varied in automobile motors, the input to the primary of the ignition coil is also varied because the time interval during which the primary current flows from the battery to the primary coil during any cycle is much shorter, thus permitting less current to flow. As the motor speed increases, the "dwell" periods decrease, consequently the current flowing into the primary during such periods of dwell decreases proportionately.

In these prior testing devices they aim to simulate actual operating conditions of the automobile by varying the speed of the motor forming part of their testing device. This of itself is very unsatisfactory, due to the fact that variable speed motor construction is such that, in order to derive fair power at high speeds, abnormally powerful motors are needed and the manufacturers of these testing devices have found it too expensive and impractical to provide motors of sufficiently high power.

Among the objects of my invention is to overcome the above disadvantages incident to prior testing devices of ignition coils and to provide a testing device which will show in a very reliable manner the difference between good coils and bad coils as well as the varying degree of efficiency between coils which are good.

In my testing device, the voltage output of the secondary of the ignition coils is caused to jump a fixed gap, and the spark may be readily viewed. The amount of current expressed in amperes that is fed to the primary circuit of the ignition coil is gradually reduced by decreasing the dwell to the point where the secondary voltage output becomes insufficient to jump the fixed gap. The primary input is then gradually increased by increasing the dwell to the point where the voltage output of the secondary is again sufficient to jump the fixed gap. This point represents the minimum amperage to induce voltage necessary for adequate fuel ignition purposes, and is indicated on a graduated scale or dial. By comparing this point with that of another coil which is tested in the same way, a definite gage can be made of the relative performance values of these coils.

In testing condensers, which are so constructed that there is no direct conductivity path for flow of electric current, a valuable check of the condition of ignition condensers resides in determining whether or not current will pass through, because of leakage, damage or breakdown of insulation or other extraneous causes. Prior testing devices for this purpose have been found objectionable, unreliable and inconvenient. My invention provides a mechanism whereby an alternating current of 110 volts is rectified, and conducted in series from the rectifier, through the condenser undergoing test, through a neon glow tube and back to the rectifier. I prefer to use a neon glow tube which will operate on approximately minimum of 80 volts and .005 ampere. By impressing on the condenser approximately 110 volts at approximately .250 ampere, there will be sufficient current and pressure to seep through leakage but not sufficient to break down insulation.

It has been proven that condensers operating in automobiles rarely build up plate potentials exceeding 100 volts. With my testing device, the condenser is charged, by the rectified current, the charge held on the condenser, and the condenser later discharged. The discharge is also registered by the neon glow tube.

Among the objects of this invention is to provide a method and apparatus for carrying out the testing operations of the condenser, including the steps heretofore outlined in a more convenient, safer and more satisfactory manner and with easier manipulation than has been accomplished with prior devices.

A further object of this invention is to carry out the steps of charging, holding and discharging in a convenient manner and without disconnecting the condenser from the tester.

Other, further and more specific objects of this invention will become readily apparent to persons skilled in the art from a consideration of the following description when taken in conjunction with the accompanying drawings wherein:

My device comprises the removable cover 2 which houses practically the entire mechanism of my device, and may, if desired, be fastened and secured in position to the base board 4, preferably made of suitable ply-wood and provided with a waterproof coating. The base board 4 supports practically the entire mechanism of my testing device. A convenient number of rubber tipped projections 6 are secured to the bottom of this base board 4 in order that my apparatus will not scratch another object upon which it may be rested. At the rear side of my device there is provided an upwardly extending plate 8 supported by the small, angular end brackets 10 and the large, vertical bracket 12 to which it is fastened by a suitable cap and screw not shown in the drawings. This plate 8 carries the flush mounted outlet 14 which is the terminal of the primary circuit of the ignition coil, the flush mounted outlet 16 to which the terminals from a storage battery are connected for supplying current to the ignition coils during test, and the plug 18 for connecting the motor 20 to a 110-volt alternating current supply. The motor 20 may be approximately 3000 R. P. M. with a tolerance of 10% in either direction of 10%. A description of the electrical connections from the outlets 14 and 16 and the plug 18 will appear further on.

The framework of the motor 20 is supported upon and fixed to the base board 4 and is held together by the lower tie bolt 22 and upper tie bolt 24. Also mounted on these tie bolts 22 and 24 is a bracket plate 26, which is held in spaced relation to the outer housing of the motor 20 by means of the collars 28 upon the bolts 22 and 24. The tie bolt 24 has upon the end passing through the bracket plate 26 a cap 30 having a threaded axial bore, so that it can function as a nut upon one end of this tie bolt. At the other end of this tie bolt 24 and also at each end of the tie bolt 22, I have provided ordinary fastening nuts 32.

The bracket plate 26 has fastened thereto a pair of guides 34 and 36 for the movable plate 38 which is slidable over plate 26 and between the inner faces of the guides 34 and 36. These guide faces are inclined about 15° from the vertical axis of my device and are perpendicular to the top face of the cover casing 2 when the latter is in place. The top face has a 15° forward slope. The plate 38 is held against the plate 26 by means of the tabs 40 and the fastening screws 42 upon the guide strips 34 and 36. The movable plate 38 has integral therewith a tongue 44 which is acted upon by a leaf spring 46 and forced upwardly against the end of the micrometer screw 48 passing through a threaded, substantially-radial bore in the cap 30. The other end of the micrometer screw is disposed within the splined member 50 having its head end 52 in the socket member 54 which turns with the shaft 56 to which a pointer 58 is fastened. By means of the set screw 59 passing through the socket member 54 and bearing against the head end 52 of the splined member 50, the splined member 50 can be made to turn with the socket member 54 and shaft 56. A centrally bored disc 60 of suitable durable material, such as celluloid, and reinforced on each side by the centrally bored metal discs 62 and 64 rests upon the socket member 54 and is secured thereto so as to rotate with this socket member 54 and the shaft 56 which passes through the bores in the discs 60, 62, and 64.

Figure 1:
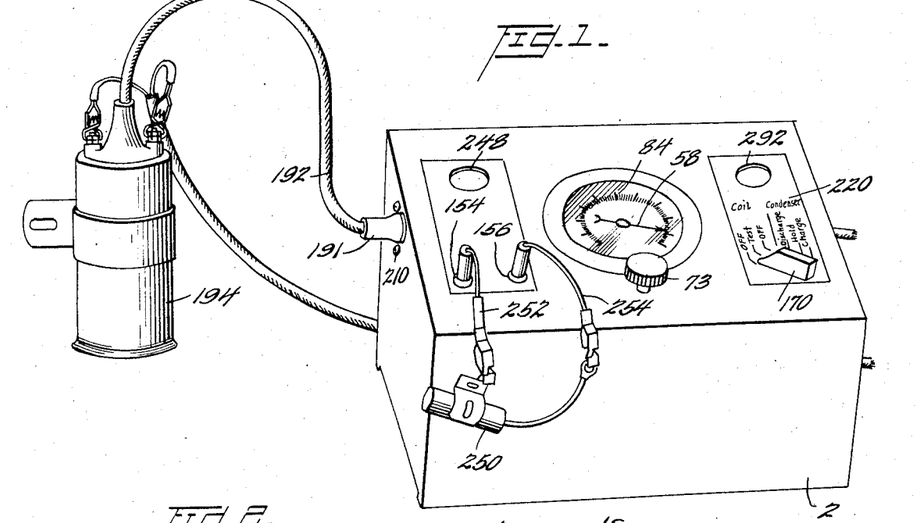
Fig. 1 is a perspective view of my testing device. An ignition coil and a condenser are also shown connected for testing.
Figure 2:
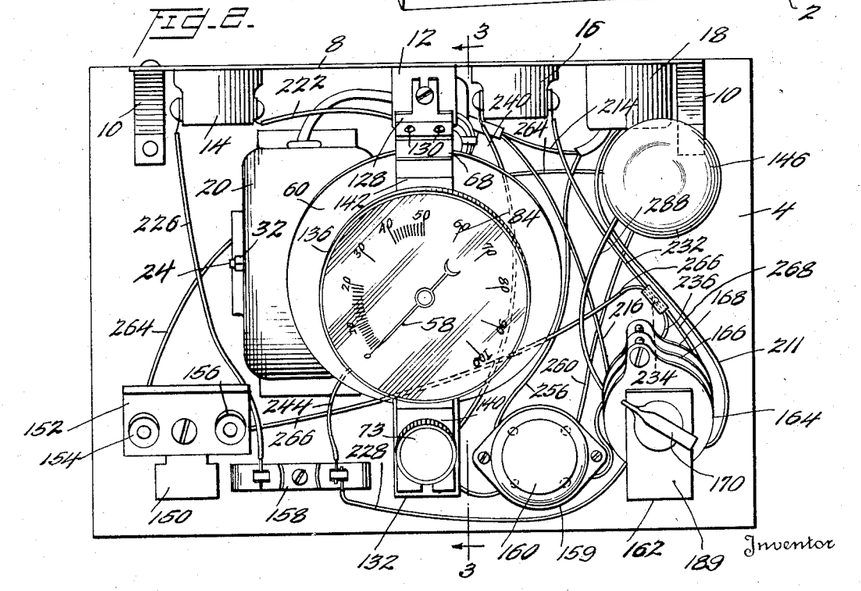
Fig. 2 is a top view of my device, with the housing or casing removed.
Figure 3:
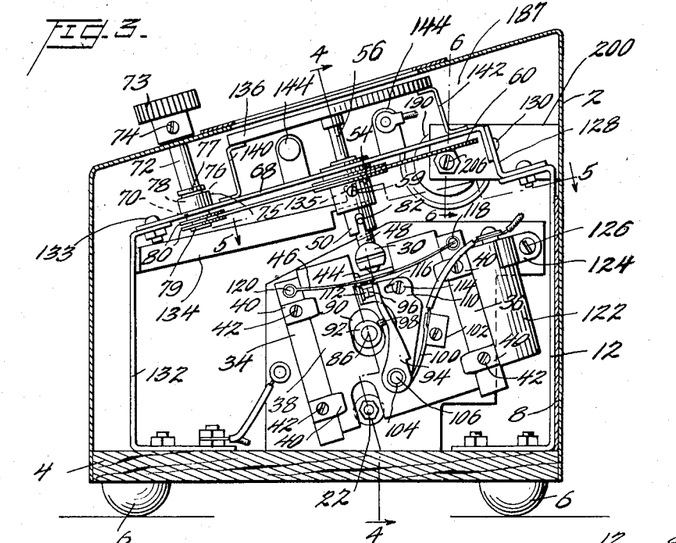
Fig. 3 is a vertical section along line 3—3 of Fig. 2.
Figure 4:
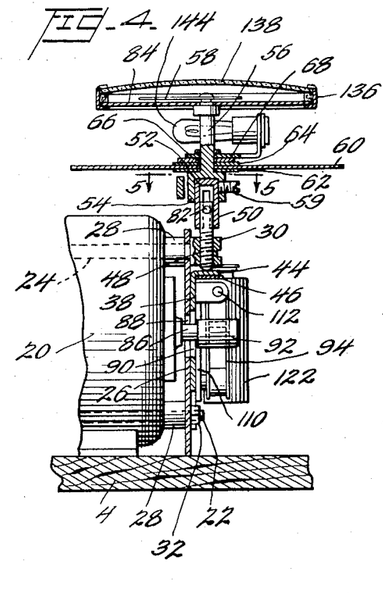
Fig. 4 is a fragmental sectional view along line 4—4 of Fig. 3.
Figure 5:
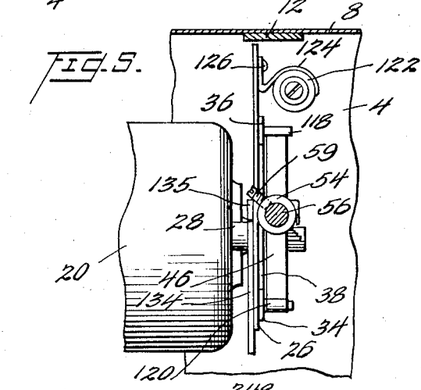
Fig. 5 is a fragmental view, partly in section along line 5—5 of Figs. 3 and 4.
Figure 6:
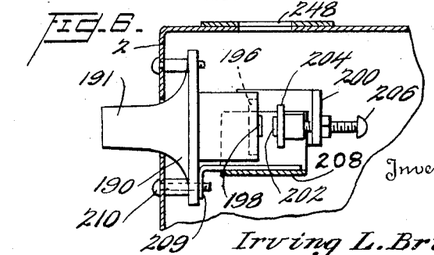
Fig. 6 is a fragmental detailed section along line 6—6 of Fig. 3 showing the socket for receiving the high tension terminal from an ignition coil and the adjustable spark gap through which this high tension current jumps.
Figures 7, 9, 10, 11, 12, 13:
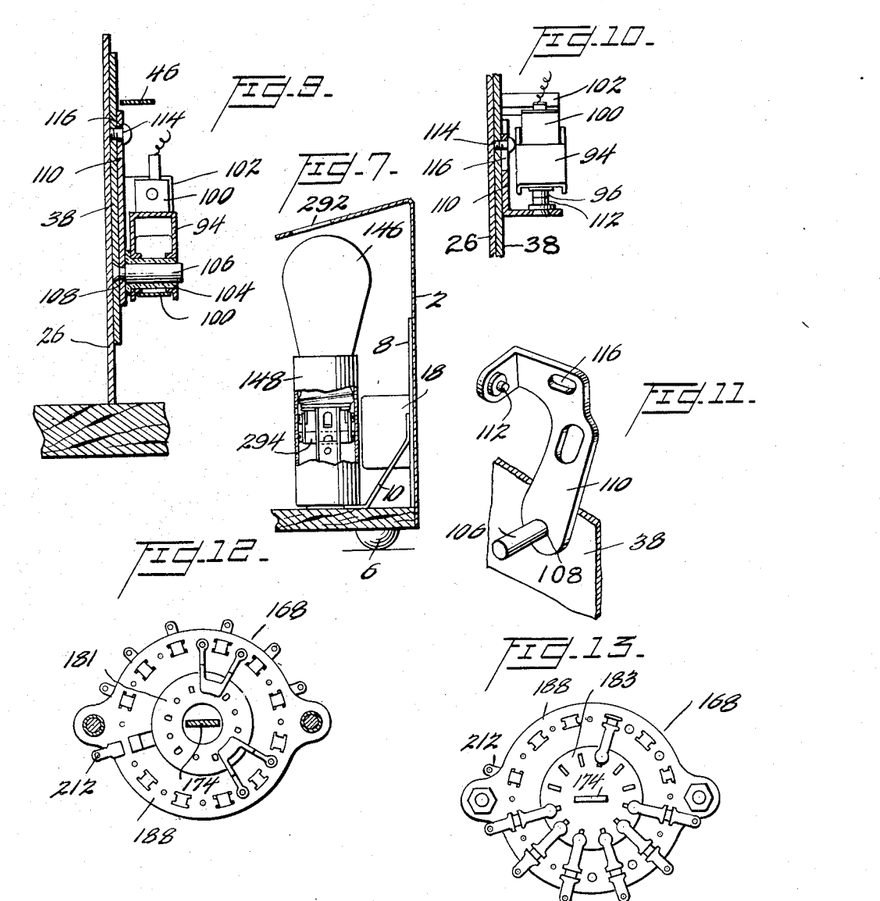
Fig. 7 is a fragmental view, partly in section, showing the neon glow tube employed in my tester and the high resistance shunt used with this glow tube.
Fig. 9 is a vertical fragmentary detail section through the shaft supporting the breaker arms.
Fig. 10 is a fragmental horizontal section through the ignition points.
Fig. 11 is a fragmental perspective view showing the fixed breaker arm and the shaft upon which it is supported.
Figs. 12 and 13 are top and bottom plan views, respectively, of one of the gang plates of the 6-position switch.

The shaft 56 also passes through a bore 66 in the cross bracket 68 which has another bore 70 (Fig. 3) through which passes the shaft or post 72. This shaft 72 extends through the housing 2 and supports the turning knob 73, which is provided with the set screw 74 for securing it to the shaft 72. Longitudinal displacement of the shaft 72 is prevented by means of the collar (75), washer (76) and spring liner (77) embracing the reduced portion (78) of the shaft 72. At the other end 79 of this shaft 72 and beneath the bracket 68 are fastened a pair of relatively small circular plates 80 which are disposed to grip the relatively large disc 60 at its periphery, so that by turning the knob 73, rotary motion will be transmitted through the shaft 72, plates 80, disc 60, socket member 54 and shaft 56 to the pointer 58 and, simultaneously, this rotary motion will be transmitted through the splined member 50 and the pin 82 to the micrometer screw 48. Thus, by means of the pointer 58, the movement of the micrometer screw 48 can be read on the graduated scale or dial 84.

The shaft 86 of the motor 20 extends through and beyond the bores 88 and 90 in the plates 26 and 38, respectively. An eccentric collar 92, eccentric to this drive shaft 86, is secured to the projecting end of this shaft and rotates therewith. The movable breaker arm 94 carries one of the ignition points 96 and also a fiber follower or rubbing block 98, the latter being held in contact with the eccentric 92 by the spring 100. One end of the spring 100 is fastened to a fiber insulation block 102 secured to the movable plate 38 and the other end of the spring is fastened around the bushing 104 which is of insulating material and insulates the breaker arm 94 from its shaft 106. This shaft 106 is fastened to the movable plate 38. The shaft 106 also passes through the bore 108 of the fixed breaker arm 110 carrying the other ignition point 112. The breaker arm 110 may be turned about its shaft 106 and secured in fixed position by the set screw 114 passing through the slot 116 of the breaker arm 110 and threading on to the movable plate 38.

The leaf spring 46 is normally in a bowed position when in use. It is fastened at one end in a slit of the stud 118, passes under and bears upwardly against the tongue 44 of the movable plate 38 and curls over the stud 120. The studs 118 and 120 pass through bores in the guides 36 and 34, respectively, and are secured to the stationary bracket plate 26.

An ignition condenser 122 is secured to the plate 26 by the small bracket 124 and screw 126.

The cross bracket 68 is secured at one end to the vertical bracket 12 by means of the angle plate 128. Each of the screws 130 passes through a slot in the angle plate 128 and into a threaded bore in the cross bracket 68 which permits some latitude in the adjustment of this cross bracket. The other end of this cross bracket 68 is fastened to another vertical bracket 132 by means of the screw and nut 133. The vertical bracket 132 is fastened to the base board 4. This bracket 132 also supports an elongated arm 134, which carries a stop member 135 positioned in the path of the projecting set screw 59 when it moves with the socket member 54 and shaft 56, thereby limiting the angular distance through which the shaft 56 can be turned and thus, preventing the pointer 58 from travelling a full 360°.

The graduated scale or dial 84 is supported at its periphery by the annular member 136 which also holds the transparent protecting cover 138. A pair of Z-brackets 140 and 142 extend from the cross bracket 68 to the annular member 136 and serve to hold this annular member 136 in proper position. The cross member 68 also supports a pair of pilot lamps 144 which serve to illuminate the dial 84 made of translucent material.

A neon glow tube 146 is secured by suitable means to the base board 4, and supported at a suitable height in order to be directly under and in registery with an opening in the casing to make the glow tube action easily visible. It is desirable to provide this neon tube with a protecting sleeve 148 of cardboard or other suitable insulating material.

My device also comprises a vertical bracket support 150 having mounted thereto a fiber insulation block 152 on which are positioned the terminal outlets 154 and 156 for receiving the leads from the condenser to be tested. These terminal outlets 154 and 156 as well as the dial 84 project through the top of the cover 2.

My device is also provided with a clip construction 158, fastened to the base board 4 for accommodating the leads of certain circuits hereinafter described.

There are fastened to the base board 4 the socket 159 of the rectifier tube 160 and the bracket 162 supporting a 6-position, 2-circuit switch 164. The rectifier tube is of the 3-element cathode type and is attached to the 4-point polarized base mounted socket 159.

The switch 164 is of a type well known to this art and comprises the upper gang plate and lower gang plate designated as a whole by the reference numerals 166 and 168, respectively, held in spaced relation by suitable means. The pointer knob 170 of this switch 164 is removably fastened by the set screw 172 to a post, connected to rotate with the flattened shaft 174. These gang plates 166 and 168 are each provided with stationary metal conductor rings 176 and 178, respectively, which are disposed between the stationary, upper central fiber insulator discs 180 and 181, respectively, and the rotatable, lower central fiber insulator annuli 182 and 183, respectively. Each of the annuli 182 and 183 is provided with a central slot in which the shaft 174 is fitted tightly and with a plurality of perforations arranged in a substantially circular row about the central slot, and through one of these perforations in annulus 182 there extends a contact brush 184 which moves with the annulus 182 and which maintains sliding contact with metallic ring 176, and likewise through one of the perforations in annulus 183 there extends a contact brush 185 which moves with the annulus 183 and which maintains sliding contact with metal ring 178. In gang plate 166, the metal ring 176, disc 180 and annulus 182 are surrounded by the stationary fiber insulator ring 186, while in the other gang plate 168, the metal ring 178, disc 181 and annulus 183 are surrounded by a similar stationary fiber insulator ring 188. These rings 186 and 188 are disposed to support a plurality of terminal points for the conductor leads in the circuits hereinafter described. The inner ends of these terminal points bear upwardly against the annuli 182 and 183 and when these discs are turned so that a brush 184 or 185 projecting therethrough is brought in alignment with the inner end of one of these terminal points, electrical connection will be established between this terminal point and the metal ring of that gang plate. The switch 164 is supported by the upper arm 189 of the vertical bracket 162 attached to the base board 4.

The housing or cover 2, preferably of metal, supports independently of the rest of the device a molding 190 of artificial resin insulating material, such as bakelite, which is provided with a terminal 191 adapted to receive the lead 192 from the high tension secondary circuit of the ignition coil 194 undergoing test. This molding 190 supports a fiber disc 196 carrying a brass or copper electrode 198. A bracket 200 fastened to the housing 2 supports another brass or copper electrode 202 which carries a fiber ring 204. The electrode 198 is fixed, while the electrode 202 may be moved to and from the electrode 198 by turning the screw 206, thereby setting the length of the spark gap between these electrodes. The length of spark is rarely changed after setting. The electrode 202 is grounded to the housing 2. The molding 190 also supports a shield 208 of high magnetic permeability metal which is grounded to the frame 2 by means of a connection 209 through the screw 210. The secondary circuit of the ignition coil is grounded through the grounding of one side of the primary circuit.

Figure 8:
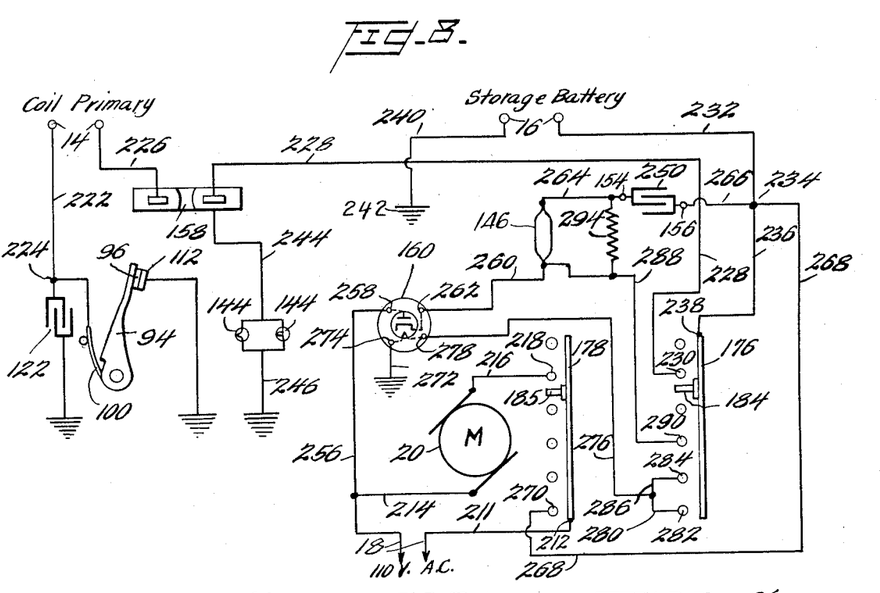
Fig. 8 is a diagrammatical illustration of the wiring or electrical conductors connecting the elements of my apparatus.
Figure 14:
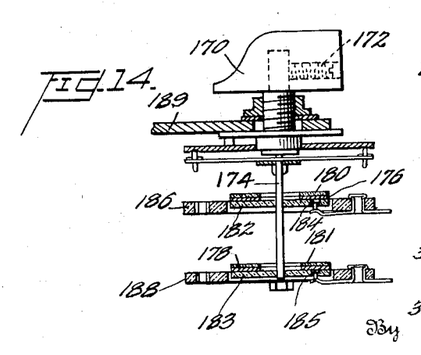
Fig. 14 is an enlarged section of the 6-position switch.

*Motor circuit.*—Referring to the diagrammatic illustration of the wiring shown in Fig. 8, this circuit comprises the lead 211 from the plug 18 through which the 110-volt alternating current is supplied to the terminal point 212 which is electrically connected to the stationary metal ring 178 of the gang plate 168. This circuit also comprises the lead 214 from the plug 18 to the motor 20 and the lead 216 from the other side of the motor to terminal point 218 on the gang plate 168. The circuit is completed when the pointer knob 170 is turned so as to turn the annulus 183 and bring the brush 185 in contact with the terminal point 218 whereby contact is established between the points 212 and 218 by way of the brush 185 and ring 178. This corresponds to the condition when the pointer knob 170 points to the Test position on the face plate 220 upon the housing 2, and is the only position at which the motor circuit is closed.

*Primary coil circuit.*—This comprises lead 222 from the terminal of the outlet 14 to spring 100 which is also part of the circuit, movable breaker arm 94, ignition point 96, ignition point 112, and the fixed breaker arm 110 which is grounded by the plates 26 and 38. The lead 222 is connected at an intermediate point 224 to one plate of the condenser 122, the other plate of the condenser 122 being grounded to the frame of the apparatus by the supporting bracket 124. This circuit also comprises the lead 226 from the other terminal of the outlet 14, the clip fastener 158, and lead 228 to terminal point 230 on the gang plate 166. The lead 232 extends from one terminal of the storage battery outlet 16 to a common junction 234, and the lead 236 extends from the junction 234 to the terminal point 238 which is electrically connected to the stationary metal ring 176 of the gang plate 166. The lead 240 extends from the other terminal of the outlet 16 to the ground terminal 242. This circuit is completed when the pointer knob 170 is turned so as to turn the annulus 182 and bring the brush 184 in contact with the terminal point 230 whereby contact is established between points 230 and 238 by way of the brush 184 and ring 176. This also corresponds to the condition when the pointer knob 170 points to the Test position on the face plate 220, so that by merely moving the pointer knob 170 to the Test position both the motor circuit and primary coil circuit are closed simultaneously. By this arrangement of the pair of gang plates 166 and 168 and the location of the brushes 184 and 185 in their respective annuli 182 and 183, the motor circuit is closed only when the circuit through the primary coil under test is closed and vice versa.

*Pilot lamps circuit.*—The pilot lamps 144 also receive their current from the 6-volt storage battery which supplies the current for the primary coil circuit. These two circuits are connected in parallel, the branch circuit for the lamps comprising the leads 244 extending from the clip fastener 158 to the lamps 144 and the leads 246 to the ground. These pilot lamps are lit only when the pointer knob 170 points to the Test position on the face plate 220, and serve to illuminate the translucent dial as well as to indicate the fact that when the primary circuit is in use the storage battery connections are secure.

In testing ignition coils, the primary terminals of the ignition coil 194 are connected to the outlet 14 and the lead 192 from the high tension secondary circuit of the coil is inserted in the outlet 191. The pointer knob 170 is then turned to the Test position on the face plate 220. This will close the circuit to the motor 20 and cause it to run. Simultaneously, the primary coil circuit will also be completed, as well as that to the pilot lamps 144, which will now be burning. As the motor 20 revolves, the eccentric collar 92 fastened to the motor shaft 86 will also rotate therewith and effect a reciprocation of the rubbing block 98, causing the breaker arm 94 to move against the tension of the spring 100 when the highest part of the eccentric 92 is moving to the rubbing block 98, and after the highest part of the eccentric 92 passes the rubbing block 98 the spring 100, which always urges the rubbing block toward the eccentric, will force back the breaker arm 94 until its return movement is arrested when the ignition point 96 contacts the ignition point 112.

If the arrest of return movement of the breaker arm 94 by the contact of the ignition points 96 and 112 occurs before the lowest point of the eccentric 92 becomes in radial alignment with the rubbing block 98, for example X degrees of the perigonal cycle of the eccentric in advance of the point of radial alignment of the lowest point of the eccentric with the rubbing block 98, the breaker arm 94 will not begin its return movement against the tension of the spring 100 until the lowest point of the eccentric 92 shall have travelled 2X degrees more of its perigonal cycle. During this interval, the eccentric 92 and rubbing block 98 will be out of contact with each other while the ignition points 96 and 112 will remain in continuous contact with each other and the "period of dwell" will be 2X degrees.

When the micrometer screw 48 is turned so as to force the tongue 44 and the movable plate 38 downward, both of the ignition points 96 and 112 will be carried downward. The fixed ignition point 112 will move in a direction parallel to the faces of the guides 34 and 36. The movable ignition point 96 will also move parallel to the path of the ignition point 112 and remain in contact with the latter until the rubbing block 98 engages the eccentric 92, after which downward movement of the plate 38 will effect separation of the ignition point 96 from the other ignition point 112 and cause the path of travel of the ignition point 96 to diverge from that of the ignition point 112. The extent of this divergence will depend upon the particular part of the eccentric 92 engaging the rubbing block 98 at the given time.

By adjusting the pivotal point of the movable breaker arm 94 and regulating the distance between this pivotal point and the follower or rubbing block 98, the contact between the eccentric and the follower or rubbing block can be so adjusted that the period of dwell will diminish from the maximum value as represented by the zero point on the scale to that represented by the 100 point on the scale.

Figure 15:
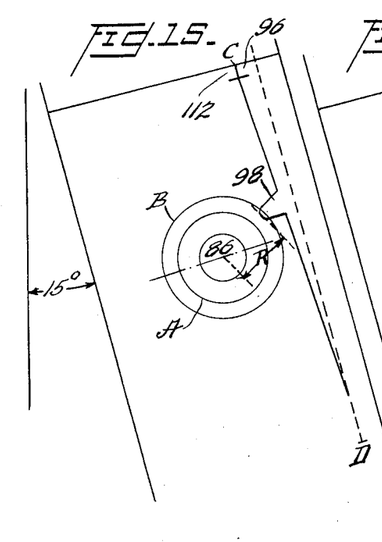
Figs. 15, 16 and 17 are schematic views illustrating on an enlarged scale three different positions of the breaker arms and the resulting differences in the periods of dwell of the breaker points for these positions of the breaker arms.
Figures 16, 17:
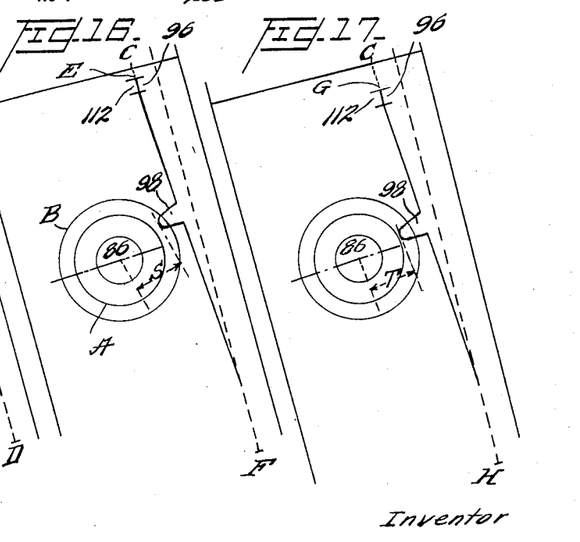

Referring to the schematic views shown in Figs. 15, 16, and 17, there are illustrated on an enlarged scale three different positions of the breaker arms, brought about through the operation of the micrometer screw 48. In Fig. 15, which shows the breaker points 96 and 112 in the highest position C and in contact, it will be seen that the tip of the rubbing block 98 terminates between the circles A and B, which represent the paths of the low and high points, respectively, of the eccentric 92 as it revolves about the drive shaft 86. In this position, the center of the shaft 106 about which the breaker arms are pivoted will be at the point D. With the ignition point 112 at C and the breaker arms shaft 106 at D, the eccentric would be out of contact with the rubbing block 98 during the period beginning when the eccentric radius in alignment with the rubbing block 98 is receding and equals the length R, diminishes to the lowest point, and increases again to the length R, after which the eccentric will be in contact with the rubbing block 98 until the eccentric radius in alignment with the rubbing block has reached its maximum and then receded to the length R. While the eccentric is in contact with the rubbing block 98 the ignition points 96 and 112 will be out of contact with each other. On the other hand, the ignition points 96 and 112 will be in contact with each other while the eccentric is out of contact with the rubbing block 98, and this constitutes the period of "dwell".

It is to be understood, however, that at the instant when the breaker points 96 and 112 make contact, the rubbing block 98 will start to separate from the eccentric 92, and that at the instant when these breaker points 96 and 112 break contact, the rubbing block 98 will begin to touch the eccentric 92. At each of these instants of change, there will be a momentary period when the breaker points 96 and 112 will be in contact with each other and the rubbing block 98 will be touching the eccentric 92.

By turning the micrometer screw 48 and causing the movable plate 38 and the ignition point 112 and the breaker arms shaft 106, which is secured to this plate, to travel in a direction parallel to the inner faces of the guide plates 34 and 36 and toward the plane passing through the axis of the shaft 86 and perpendicular to the guiding faces, when the ignition point 112 has moved to the position E, in Fig. 16, the breaker arms shaft 106 will have moved to the position F. In this position, the outer tip of the rubbing block 98 is also between the circles A and B but closer to the circle A than in Fig. 15. In this case, the eccentric will be out of contact with the rubbing block during the period beginning when the eccentric radius in alignment with the rubbing block 98 is receding and equals the length S, diminishes to the lowest point, and increases again to the length S, after which the eccentric will be in contact with the rubbing block 98 until the eccentric radius in alignment with the rubbing block has reached its maximum and then receded to a length S. Since S is less than R, the period during which the eccentric and rubbing block are out of contact with each other will also be less. Consequently, in the position shown in Fig. 16, the period of contact or dwell between the ignition points 96 and 112 will be less than in the position illustrated in Fig. 15.

By turning the micrometer screw 48 further and causing the ignition point 112 and the breaker arms shaft 106 to travel in a direction parallel to the inner faces of the guide plates 34 and 36 and further toward the plane passing through the axis of the shaft 86 and perpendicular to the guiding faces, when the ignition point 112 has moved to the position G in Fig. 17, the breaker arms shaft 106 will have moved to the position H. In this position, the outer tip of the rubbing block 98 will be between the circles A and B and closer to circle A than in Fig. 16. The length T, corresponding to the length S in Fig. 16, will also be less than this length S. Consequently, the period of dwell between the ignition points 96 and 112 will be less than in the position shown in Fig. 16.

By turning the micrometer screw 48 still further and continuing the movement of the ignition point 112 and the breaker arms shaft 106, a point will be reached where the rubbing block 98 will be at the inner circle A. In this position the period of dwell and the time of contact between the ignition points 96 and 112 will vanish.

The graduated scale or dial 84 is so adjusted in its connection with the micrometer screw 48 that when the pointer 58 is at zero, the period of dwell is sufficient to permit the flow of 1 ampere of current at 6 volts pressure through the primary circuit of a standard coil of average design, which represents the standard period of dwell at which the ignition points in the energizing circuit of ignition coils employed on automobiles are operated. Reduction in the period of dwell is accompanied by a decrease in the amount of current, expressed in amperes, that is fed to the primary circuit of the ignition coil and, consequently, by a decreased secondary voltage output of the coil.

To test an ignition coil, it is connected as heretofore described and the dial 84 set to the zero reading. The pointer knob 170 is now switched to the Test position and the dial reading is then increased by turning the knob 73 until the spark ceases, as can be viewed through the opening 248 in the top of the housing 2. The dial reading is then reduced, by turning the knob 73 in the reverse direction, until the spark commences. The dial reading at this point indicates the comparative efficiency of the coil under test with respect to other coils which have been subjected to similar test. Efficiency in an electrical devices is the ratio of output to input. By using the fixed gap as above which measures the output in volts and by measuring reduction of input as above, the unit delivering an equal output on the least input is obviously that with the highest efficiency.

It will be seen that with my device the motor 20 is not in the storage battery circuit, whereby I am able to avoid the very undesirable feature of reducing the battery voltage available to the ignition coil to a point below normal car-operating conditions, which are at a higher rather than a lower voltage, due to the fact that, in an automobile under car-operating conditions, the generator, which is the battery charging device, is in continuous operation. Also, by my method of varying the period of dwell, the necessity of using a variable speed motor with its objectionable features previously described is eliminated.

*Condenser test circlits.*—With the condenser 250 to be tested having its leads 252 and 254 inserted in the terminal outlets 154 and 156, respectively, and the pointer knob 170 switched to the Charge position, there will be a circuit from the plug 18 by way of the lead 256 to a point 258 of the rectifier tube 160, the lead 260 from the point 262 of the rectifier 160 to the neon glow tube 146, the lead 264 from the neon tube to the condenser terminal 154, the condenser 250, the lead 266 from the condenser terminal 156 to the common junction 234, the lead 268 from this junction 234 to the terminal point 270 on the gang plate 168, the brush 185, metal ring 178 to terminal point 212, and lead 211 from terminal point 212 to the plug 18. The heater circuit for this Charge position of the condenser 250 comprises the lead 240 from the outlet 16 to the ground terminal 242, the ground connection 272 from the point 274 of the rectifier 160, the lead 276 from the point 278 of the rectifier 160, the lead 280 to terminal point 282 of the gang plate 166, brush 184, metal ring 176 to terminal point 238, lead 236 to junction 234 and lead 232 back to outlet 16.

While in this Charge position, the alternating current passes through the rectifier 160 and is converted into a pulsating direct current, which serves to charge the condenser 250, and the current from the 6-volt storage battery heats the cathode in the rectifier 160. By this arrangement, the entire 110 volts of the alternating current is in series with the rectifier tube, yielding a pulsating direct current with a peak of about 108 volts.

By switching the pointer knob 170 to the Hold position and with the condenser 250 still having its leads 252 and 254 inserted in the terminal outlets 154 and 156, respectively, the charging circuit will be broken, but the heater circuit will be closed as in the Charge position, with the exception that the brush 184 will now make electrical contact between the metal ring 176 and terminal point 284 of the gang plate 166 in lieu of terminal point 282, and the lead 286 from the terminal point 284 to lead 276 will now constitute part of the circuit instead of lead 280. In this position, the condenser 250 should retain the charge if in proper condition.

By switching the pointer knob 170 to the Discharge position with the condenser 250 still connected, the heater circuit will be broken, but there will be a circuit across the condenser. This circuit comprises lead 264 from terminal outlet 154, neon tube 146, lead 288 to terminal point 290 of the gang plate 166, brush 184, metal ring 176 to terminal point 238, lead 236, and lead 266 to terminal outlet 156. If the condenser has retained a charge of over 80 volts, it will now discharge and show a flash of the neon glow tube 146 which is in series with it. This flash will be visible through the opening 292 in the housing 2. I have found it desirable to provide a high resistance shunt 294, of about 1,000,000 ohms, across the leads 264 and 288.

In testing a condenser, the condenser leads are connected to terminal outlets 154 and 156 and the pointer knob 170 switched to Hold position for 30 seconds, to permit the heater circuit of rectifier to function, and then to Charge position and the glow of the neon tube 146 is observed. The pointer knob 170 is then switched to Hold position for 30 seconds and then to discharge position. A flash registered by the neon tube 146 shows that the charge was held by the condenser. If this flash be a single flash, it denotes an excellent condenser; flashes occurring less than once per second indicate a usable condenser; while flashes of greater frequency than once per second indicate a condenser that should be rejected.

It will be seen that with my apparatus I am able to carry out the steps of charging, holding and discharging in a convenient manner and without disconnecting the condenser from the tester.

My apparatus can also be employed for testing high and low resistance circuits and has special value in the testing of high resistance circuits for continuity.

Figure 18:
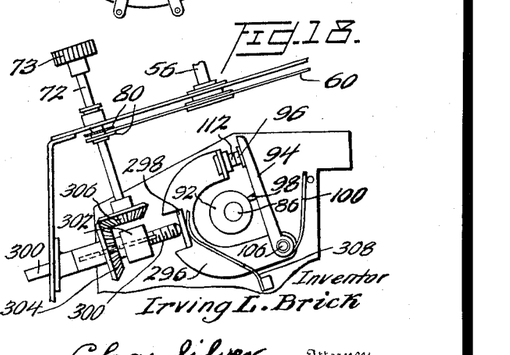
Fig. 18 is a detail fragmental view illustrating a modified form for varying the period of dwell.

In the modification shown in Fig. 18, the eccentric collar 92, eccentric to the motor shaft 86, is mounted upon and rotates with the shaft 86 and acts upon the rubbing block 98 of the movable breaker arm 94. This breaker arm 94 is pivoted upon the shaft 106 and carries the movable breaker point 96. The fixed breaker arm 296 is also pivoted upon the shaft 106 and carries the fixed breaker point 112. The fixed breaker arm 296 has a projecting portion or tongue 298 for contacting the adjusting screw 300, which is in engagement with the threaded bore of a fixed stud 302. The adjusting screw 300 is operated by the knob 73 and shaft 72 through any suitable means such as the bevel gears 304 and 306. The adjusting screw 300 is keyed to the gear 304 in a suitable manner to allow axial movement of the screw 300 in the gear 304. By turning the knob 73, the adjusting screw 300 will also turn and cause the breaker arm 296 and the breaker point 112 to move toward or away from the breaker point 96. As the fixed breaker arm 296 and the breaker point 112 move toward the breaker point 96, the period of dwell of the breaker points 96 and 112 decreases.

The rubbing block 98 is urged toward the eccentric 92 by the spring 100 and when in contact with the eccentric serves to separate the breaker points 96 and 112. When these breaker points are in contact, the rubbing block is out of contact with the eccentric 92. The movement of the knob 73 is also transmitted through circular plates 80 and disc 60 to the shaft 56, operating the pointer 58 over the graduated scale 84, as in Figs. 1, 2, 3, and 4. The spring 308 urges the tongue 298 and arm 296 toward the adjusting screw 300.

The present invention is not limited to the specific details set forth in the foregoing examples which should be construed as illustrative and not by way of limitation, and in view of the numerous modifications which may be effected therein without departing from the spirit and scope of this invention, it is desired that only such limitations be imposed as are indicated in the appended claims.

I claim as my invention:

1. In an apparatus for testing a condenser, an electric switch, a rectifier adapted to convert an alternating current into a pulsating direct current, a glow tube, a circuit wherein said rectifier, said glow tube, the condenser and said switch are in series with a source of alternating current, a second circuit establishing series electrical connection from a storage battery, through the switch, through the heater element of the rectifier, through the ground and back to the storage battery, and a third circuit wherein the glow tube is connected in series with the condenser and said switch, said switch being provided with selective means whereby the first described circuit and the second circuit may be closed simultaneously, whereby the second circuit may be closed individually and whereby the third circuit may be closed individually, without disconnecting the condenser.

2. In an apparatus for testing a condenser and an ignition coil having primary and secondary windings, means to energize the primary of said coil including a primary circuit electrically connected to receive energy from a storage battery, a motor circuit, and motor operated means having a fixed breaker point and a movable breaker point to make and break the primary circuit, a shaft for the motor, an eccentric carried by said shaft and adapted to rotate therewith, an arm carrying said movable breaker point, means for pivotally supporting said arm, means for moving the fixed breaker point and the pivotal support for the movable breaker point in parallel paths and a follower on said arm adapted to engage said eccentric and to undergo a variation in the contact with the eccentric for each perigonal cycle of the eccentric when the fixed breaker point and the pivotal support for the arm carrying the movable breaker point are moved in paths parallel to each other, an electric switch, a rectifier adapted to convert an alternating current into a pulsating direct current, a glow tube, a third circuit wherein said rectifier, said glow tube, the condenser and said switch are in series with a source of alternating current, a fourth circuit establishing series electrical connection from a storage battery, through the switch, through the heater element of the rectifier, through the ground and back to the storage battery, and a fifth circuit wherein the glow tube is connected in series with the condenser and said switch, said switch being provided with selective means for simultaneously opening and simultaneously closing said motor and primary circuits whereby the third circuit and the fourth circuit may be closed simultaneously, whereby the fourth circuit may be closed individually, and whereby the fifth circuit may be closed individually, without disconnecting the condenser.

IRVING L. BRICK.